United States Patent Office 3,158,065
Patented Nov. 24, 1964

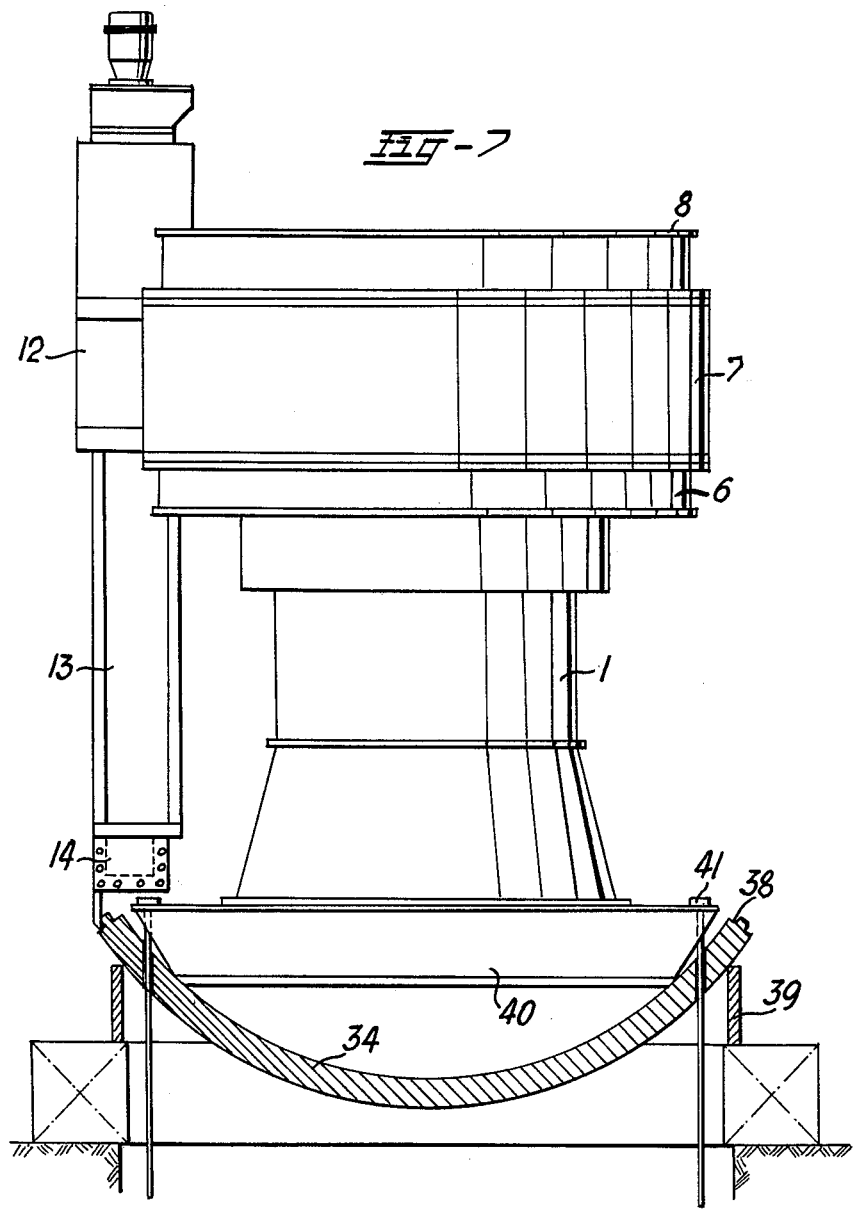

3,158,065
SWIVELLING BASE LATHE
Jan Kořenek and Karel Kulhánek, Plzen, Czechoslovakia, assignors to Závody V. I. Lenina Plzen, Narodni Podnik, Plzen, Czechoslovakia
Filed Dec. 8, 1961, Ser. No. 158,026
Claims priority, application Czechoslovakia, Dec. 12, 1960, 7,418/60
6 Claims. (Cl. 90—12)

The invention relates to a turning lathe with a swivelling or rotatable base having a main or bottom portion and additional units adapted for attachment to the main portion to extend the range of machining operations which the lathe is able to perform. The additional units are added to the main portion of the rotatable base in various combinations in accordance with the machining operation to be carried out on a given work piece. The turning lathe in accordance with the invention is particularly useful in machining surfaces of bodies having a ring-shaped cross-section, such as cylinders, cylindrical vessels, or a profiled shape, such as curved covers or lids, and the like.

Heretofore, ring-shaped work-pieces have been usually machined on heavy boring and turning mills where the machined object is clamped on the rotary plane of the machine itself, or, in exceptional cases, by means of a single-purpose device with a rotary wing having a fixed radius in accordance with the maximum diameter of turning. The overhanging wing has a carriage movable radially therealong and carrying a telescopic slide. These devices have always to be inserted into the work-piece.

It is very difficult, and for various reasons sometimes even impossible, to transport very large and heavy work pieces to the machining device. Such objects are therefore completely or at least partly produced at their location. It is, however, very costly to bring each of the usual machine tools to the location of the work-piece, and to remove each machine tool from such location after having been used but once. Another disadvantage of such machines resides in the fact that they are not suitable for carrying out all operations required by the employed type of machining technology, and several types of machines are therefore necessary to complete the machining.

It is an object of this invention to eliminate the above drawbacks. The lathe in accordance with the invention is designed so that the main part of its rotatable base can be readily supplemented with an additional unit or units selected in accordance with the machining operation to be carried out; and the lathe can be used without special adaptions at any work-place. The machining operations which can be performed by the lathe will be explained below by reference to several examples.

One of the main features of the invention is the basic assembly thereof which comprises a machine frame or stand adapted to be anchored in a foundation grate or attached to the locating base of the work-piece, or a locating plate placed on the work-piece, and a swivelling base which is rotatably mounted on the machine stand and is provided with a horizontally travelling arm. On one end of this arm is arranged a vertically travelling slide the lower portion of which is provided with a holder for receiving a machining tool, for example a cutting tool. As required, the work-piece which is attached to a base, may be slipped over the machine, or the machine may be set into the work-piece and secured therein.

By means of this basic assembly of the lathe it is possible to machine rings the size of which is determined by the working range of this assembly, or to mill, drill and bore horizontal and vertical surfaces, and to turn conical surfaces.

This fundamental range of operations can be extended by adding to the main or basic lathe assembly additional units by means of which it becomes further possible to machine the inside and mouths of upright cylinders or vessels of any height; and also to machine the covers or lids of such vessels of any type.

A great advantage of the lathe embodying this invention is its good working accuracy and its small weight combined with a wide working range. A further advantage is its relatively low power consumption resulting from an antifriction mounting of the swivelling base for the main cutting movement, and the possibility of securing the swivelling base in any angular position.

The invention will be best understood from the following detailed description of illustrative embodiments to be read in conjunction with the accompanying drawings which illustrate the use of the novel lathe for various machining operations.

In the drawings:

FIG. 2a is a view showing the mounting of an angled head on the machine slide to provide for the rotation of a cutting tool about a horizontal axis;

FIG. 7 illustrates machining of the marginal surface of a lid.

It is obvious from the figures that the lathe in accordance with the inventions consists of a main or basic assembly comprising several fundamental units, and of several additional units.

Figure 1:
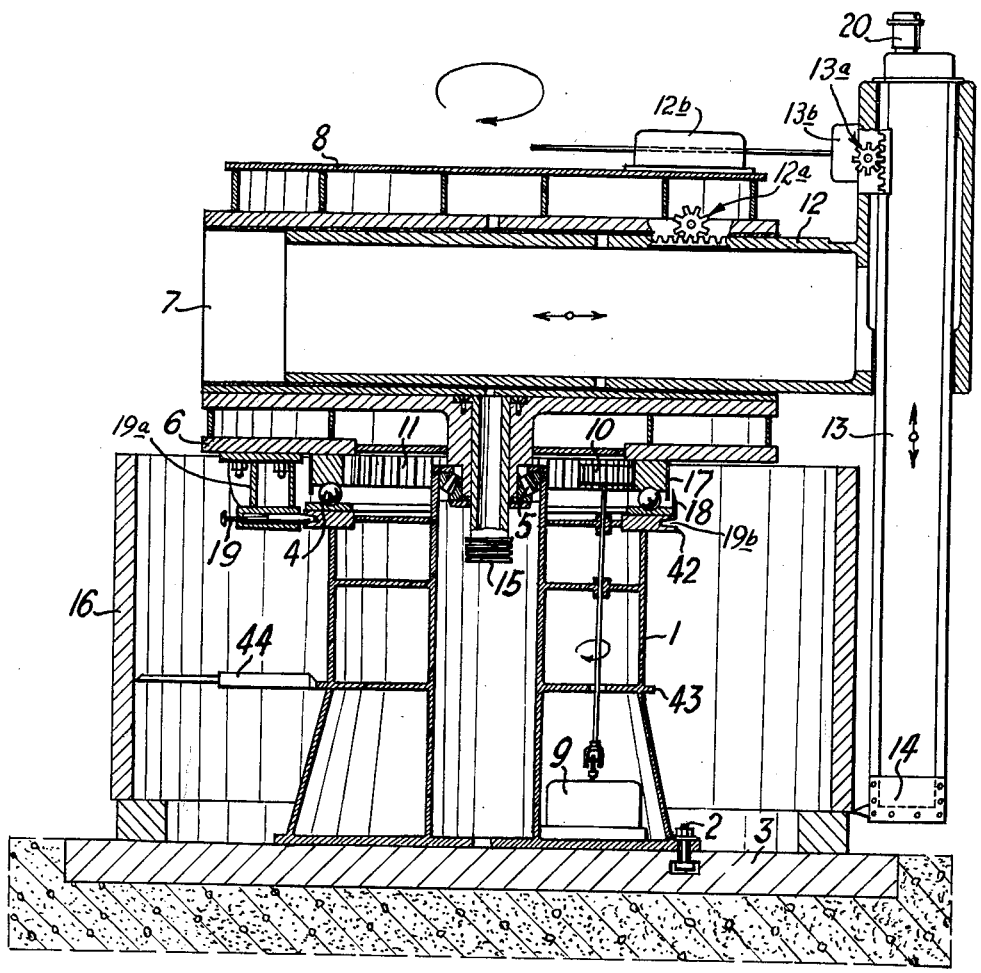
FIG. 1 is a schematic vertical sectional view of the machine illustrating its use for machining rings.

Referring now more particularly to FIG. 1, it can be seen that the main assembly of the lathe consists of a frame or stand 1 which, for example, is attached by means of securing elements 2 to foundation grate 3. The body of a swivelling base which comprises bottom portion 6, central portion 7 and top portion or cover 8, is rotatably mounted in an antifriction manner on a large axial roller bearing 4 arranged on the outer circumference of the top of stand 1, and on a tapered roller bearing 5 mounted in the center of the stand. The axial bearing transfers the main axial pressure from above, and the tapered roller bearing ensures maintenance of the coaxial relationship of stand 1 and the body 6, 7 and 8 in all directions. The swivelling base is rotated by means of motor or other drive 9 through a pinion 10 meshing with a ring gear 11 secured to bottom portion 6. In the swivelling base is arranged a horizontally movable arm 12 having a head in which a slide 13 is vertically movable. In the lower portion of the slide is attached a tool holder 14. Electric current is supplied to the swivelling base through a ring collector 15.

Horizontal movement of arm 12 in base 6, 7 and 8 is effected by a gear and rack arrangement 12a operated by a drive 12b, while vertical movement of slide 13 relative to arm 12 is effected by a gear and rack arrangement 13a operated by a drive 13b. Planar surfaces are machined by horizontal advance of arm 12, and cylindrical surfaces are machined by the vertical advance of slide 13. Conical surfaces with an apex angle from 5° to 85° are machined by a combination of both advances using exchangeable gears.

If arm 12 is pushed in and slide 13 is fully advanced downwards, one obtains the smallest cap diameter and the smallest lifting height of the fundamental crane for work-piece 16.

The swivelling base is provided with a scale 17 which is divided or calibrated into 360°, and the machine stand carries a corresponding pointer 18 by means of which it is possible to read the angular position of the swivelling base which may be locked in any position by means of stops 19. As shown, each stop 19 may be constituted by a pin which is radially movable in a bracket 19a secured to the lower portion 6 of the rotatable base, and which has a wedge shaped inner end for frictional locking engagement in an outwardly flaring groove 19b extending circumferentially around the top of stand 1.

Stationary stand 1 may also be used with advantage as a base or datum from which the diameters of the machined bores of work-piece 16 can be measured. For this purpose, stand 1 is formed with accurately machined cylindrical surfaces 42 and 43 from which the dimensions and geometry of work-piece 16 in FIG. 1, 26 in FIG. 3 and 27 in FIG. 4 can be measured, for example by means of an end measuring rod 44, as shown on FIG. 1.

Figure 2:
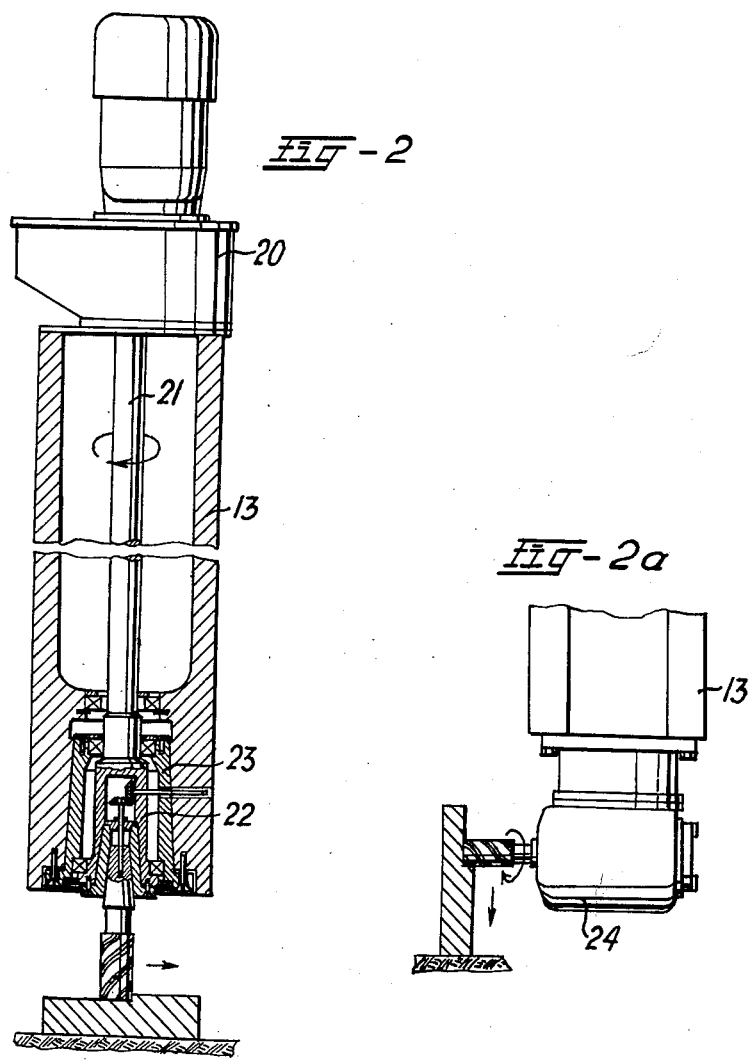
FIG. 2 illustrates the mounting of a milling and drilling or boring device on the machine slide.

The way of carrying out drilling and milling operations will now be explained with reference to FIG. 2. It can be seen, from this figure that the upper end of slide 13 carries a motor or drive 20 the rotary movement of which is transferred by means of shaft 21 to a spindle 22 holding a cutter or drill rotatable about a vertical axis. Spindle 22 is housed in a body 23 which is attached to slide 13 in place of the tool holder 14 shown in FIG. 1. Drilling and milling operations on vertical surfaces are accomplished by means of an angled rotary head 24 shown in FIG. 2a. The head 24 is attached to the lower end of slide 13 and supports the machining tool for rotation about a horizontal axis.

Figure 3:
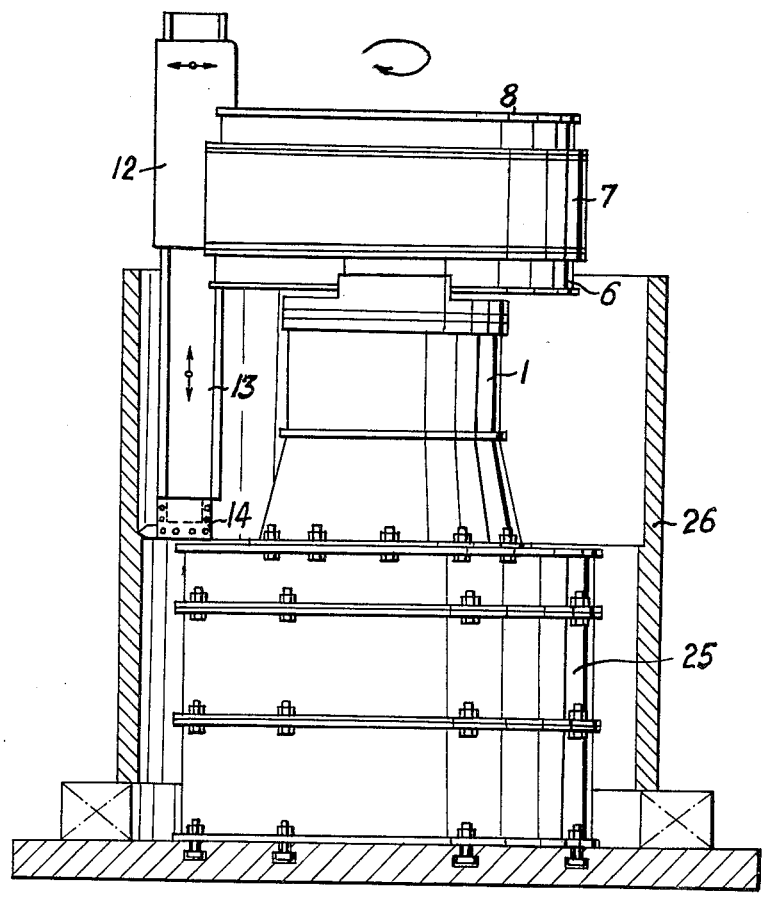
FIG. 3 shows the arrangement of the machine for turning rings which are higher than the length of the vertical slide travel.

By placing the machine stand 1 on pedestal 25, as illustrated in FIG. 3, it is possible to machine cylindrical work-pieces, such as ring 26, of a greater height than the maximum travel of slide 13. In the case illustrated the maximum machinable height of the work-piece is twice the maximum travel of the slide.

Figure 4:
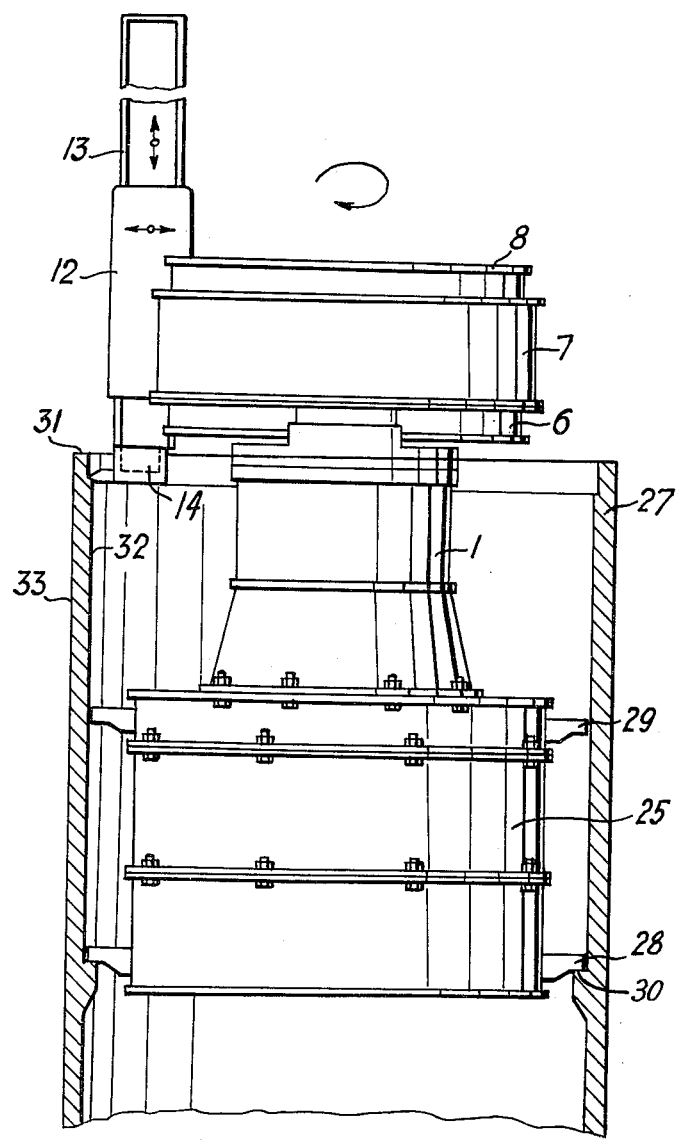
FIG. 4 shows the arrangement of the machine for machining the inside and the mouth of cylinders or vessels of any height.

FIG. 4 illustrates how the machine stand 1 can be positioned in a work-piece in the form of a cylinder or vessel 27 standing upright and being higher than twice the maximum slide travel. The bottom and top portions of auxiliary pedestal 25 are provided with jaws 28, 29, respectively, which are for example of the radially telescopic type. To provide a support for these jaws on the individual rings which are welded together to form the work-piece, internal steps 30 are left over while pre-machining the rings. The number of such steps depends on the height of vessel 27. The distance between steps 30 on the various rings should be slightly smaller than twice the maximum travel of slide 13.

In the position shown in FIG. 4, the machine stand is supported by the bottom jaws 28, while the top jaws 29 increase the accuracy of the radially centering of the pedestal 25. After machining top surface 31, inner surface 32, and outer surface 33 of the vessel, to a height equalling the maximum slide travel, the pedestal 25 is lowered and suspended on steps 30 by hinges 29. The bottom jaws 28 now increase the accuracy of the centering of the pedestal. By proceeding in this manner downwards from step to step, the entire machine is successively displaced along the total height of the vessel, and thus an inner surface 32 of any height can be machined.

Figure 5:
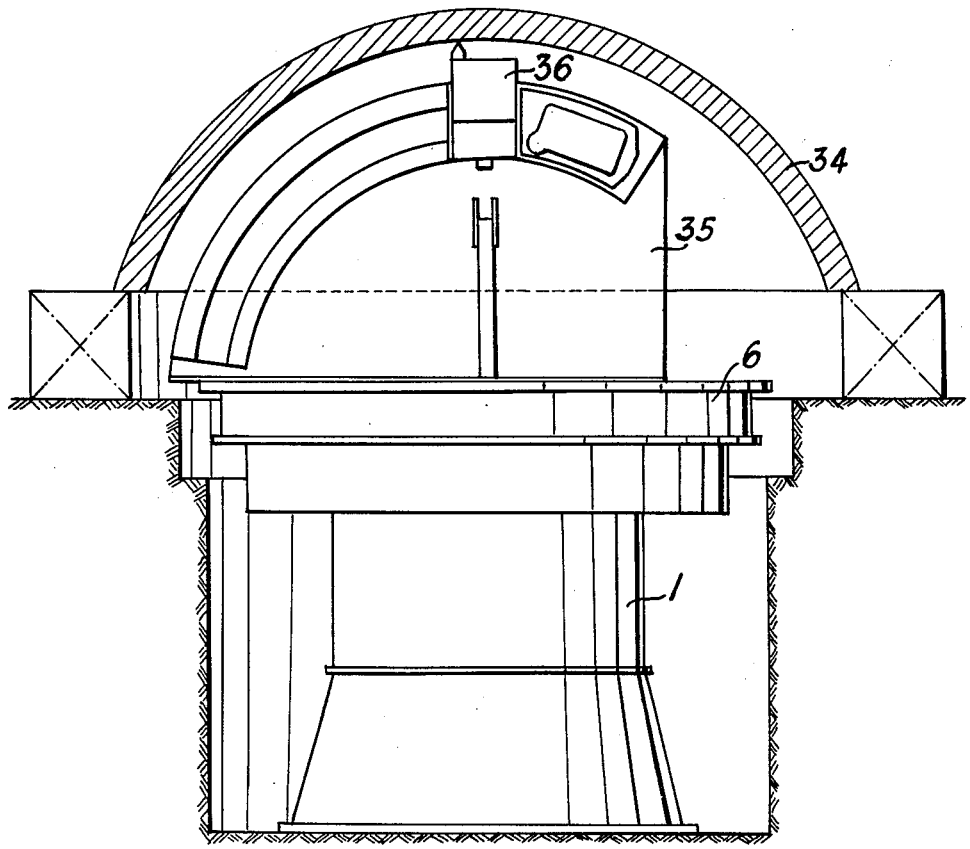
FIG. 5 illustrates machining of the inner surface of a semispherical lid.

Machining of the inner surface of a curved lid or cover 34 will be described with reference to FIG. 5. In the illustrated case, the lid 34 has a spherical surface. After removal of the portions 7 and 8 of the rotatable base, a shaped guide 35 corresponding to the configuration of a generatrix of the inner surface of the lid 34 is attached to bottom portion 6 of the swivelling base. Carriage 36 of the lathe is movable by a conventional feed device along the shaped guide 35. By rotating bottom portion 6 and guide 35 about the vertical axis of stand 1, and moving carriage 36 along the guide 35, the desired shape of the inner surface of lid 34 is machined.

Figure 6:
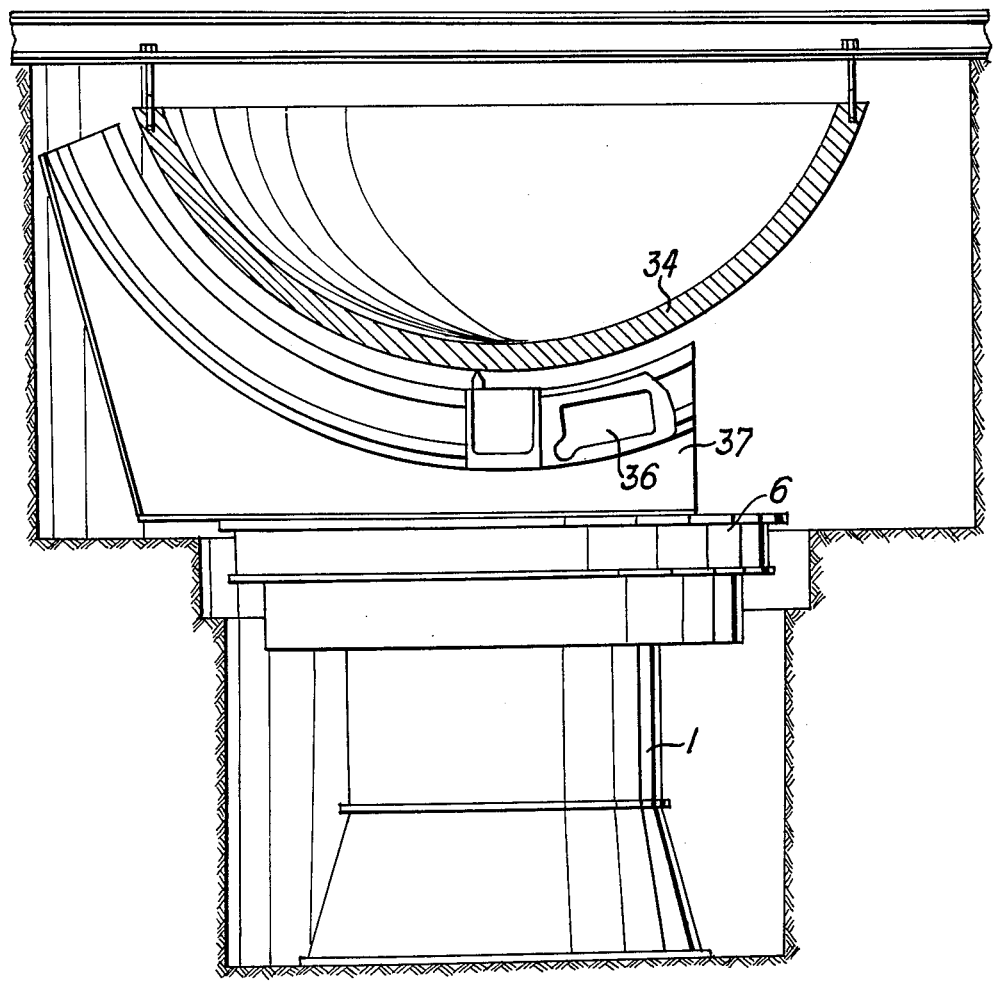
FIG. 6 illustrates machining of the outer surface of a semispherical lid.

FIG. 6 illustrates how the outer surface of lid 34 can be machined. In this case, a shaped guide 37 for the outer shape of the lid is substituted for guide 35 illustrated in FIG. 5. In all other respects machining proceeds in the same manner as described above.

FIG. 7 shows how the marginal surface 38 of lid 34 can be machined. Locating plate 40 is placed in lid 34 which rests on ring 39. The work-piece is held to the machine base by means of screws 41 passing through auxiliary holes provided in lid 34.

The described lathe can be used at all assembly and production sites where large ring-shaped work-pieces have to be machined, such as for example stators of electric generators, bodies of water turbines, and the like.

What we claim is:

1. A rotatable base lathe comprising: a stationary stand; a base including a bottom portion mounted rotatably on top of said stand and a central portion and top portion removably secured on said bottom portion; a horizontally movable arm mounted in said central portion of the rotatable base and having a head at an outer end of said arm for movement radially with respect to the axis of rotation of said base in response to retraction and extension of said arm relative to said base; a vertically movable slide mounted in said head with the longitudinal axis of said slide extending at right angles to the longitudinal axis of said arm so that said slide lies close to said rotatable base when said arm is retracted in the latter; and means at one end of said slide for holding a cutting tool.

2. A rotatable base lathe as in claim 1; said bottom portion of the base is mounted on an axial roller bearing carried by the top of said stand at the outer periphery of the latter for transmitting major axial loads to said stand from said base thereabove, and on a tapered roller bearing located at the center of said top of the stand and operative to maintain concentricity of said base and stand.

3. A rotatable base lathe as in claim 2; wherein said stand has accurately machined cylindrical surfaces extending therearound to form a datum for measuring the diametrical dimensions and concentricity of a work-piece extending around the stand.

4. A rotatable base lathe as in claim 1; wherein said means for holding a cutting tool includes a vertical spindle rotatable in said slide and having a chuck for gripping a rotary cutting tool; and further comprising drive means mounted on said slide and coupled with said spindle for rotating the latter.

5. A rotatable base lathe as in claim 1; further comprising an auxiliary pedestal having said stand removably mounted thereon to permit the machining of work-pieces having a height greater than the vertical travel of said slide.

6. A rotatable base lathe as in claim 5; wherein said auxiliary pedestal has radially movable jaws for mounting the pedestal at selected elevated positions within a high workpiece to be machined.

(References on following page)

References Cited by the Examiner

UNITED STATES PATENTS

| | | | |
|---|---|---|---|
| 145,103 | 12/73 | Henderson et al. | 82—4 |
| 693,015 | 2/02 | Hess. | |
| 873,787 | 12/07 | Riddell. | |
| 1,307,520 | 6/19 | Schurger | 82—28 |
| 1,601,999 | 10/26 | Cullen | 90—12 |
| 1,714,103 | 5/29 | Parks | 82—4 X |
| 1,832,923 | 11/31 | Turner | 82—4 |
| 2,553,570 | 5/51 | Flynn | 82—4 |
| 3,057,234 | 10/62 | Heer | 82—2 |

FOREIGN PATENTS

| | | |
|---|---|---|
| 819,483 | 10/51 | Germany. |
| 852,636 | 10/52 | Germany. |
| 259 | 1/77 | Great Britain. |

WILLIAM W. DYER, Jr., *Primary Examiner.*